(12) United States Patent
Bush

(10) Patent No.: US 7,174,300 B2
(45) Date of Patent: Feb. 6, 2007

(54) DIALOG PROCESSING METHOD AND APPARATUS FOR UNINHABITED AIR VEHICLES

(75) Inventor: Stephen Francis Bush, Latham, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 747 days.

(21) Appl. No.: 10/015,025

(22) Filed: Dec. 11, 2001

(65) Prior Publication Data

US 2003/0110028 A1    Jun. 12, 2003

(51) Int. Cl.
*G10L 15/00*    (2006.01)

(52) U.S. Cl. ..................... 704/275; 704/270

(58) Field of Classification Search ................ 704/257, 704/275, 270, 251, 230
See application file for complete search history.

(56) References Cited

U.S. PATENT DOCUMENTS

| | | | | |
|---|---|---|---|---|
| 4,725,956 | A * | 2/1988 | Jenkins ........................... | 701/2 |
| 5,208,750 | A * | 5/1993 | Kurami et al. ................. | 701/28 |
| 5,384,892 | A * | 1/1995 | Strong ........................ | 704/243 |
| 5,714,948 | A * | 2/1998 | Farmakis et al. ........... | 340/961 |
| 6,070,139 | A * | 5/2000 | Miyazawa et al. .......... | 704/275 |
| 6,314,402 | B1 * | 11/2001 | Monaco et al. ............. | 704/275 |
| 6,356,869 | B1 * | 3/2002 | Chapados et al. .......... | 704/275 |
| 6,529,866 | B1 * | 3/2003 | Cope et al. .................. | 704/205 |
| 6,655,631 | B2 * | 12/2003 | Austen-Brown ........... | 244/12.4 |
| 6,735,592 | B1 * | 5/2004 | Neumann et al. ........... | 707/101 |
| 6,839,669 | B1 * | 1/2005 | Gould et al. ................. | 704/246 |
| 6,839,670 | B1 * | 1/2005 | Stammler et al. ........... | 704/251 |
| 2002/0133347 | A1 * | 9/2002 | Schoneburg et al. ........ | 704/257 |
| 2002/0161584 | A1 * | 10/2002 | Lewis et al. ................. | 704/275 |
| 2002/0169613 | A1 * | 11/2002 | Damiba ...................... | 704/270 |

OTHER PUBLICATIONS

Doherty et al., The WITAS Unmanned Aerial Vehicle Project, Proceedings of the 14th European Conference on Artificial Intelligence, Amsterdam 2000.*

* cited by examiner

*Primary Examiner*—Daniel Abebe
(74) *Attorney, Agent, or Firm*—Scully, Scott, Murphy & Presser, P.C.

(57) ABSTRACT

A dialog processing method and apparatus for uninhabited air vehicles is described. The apparatus contains a recognition unit for recognizing incoming data, an interpretation unit for interpreting the data according to a grammar and a response unit for generating an appropriate response to the incoming data. The method may utilize natural language processes and may reduce to a finite state machine. The incoming data is combined with uninhabited air vehicle state information to increase the accuracy of this interpretation. Additionally, the dialog states may be limited to customary air traffic control dialogs.

16 Claims, 5 Drawing Sheets

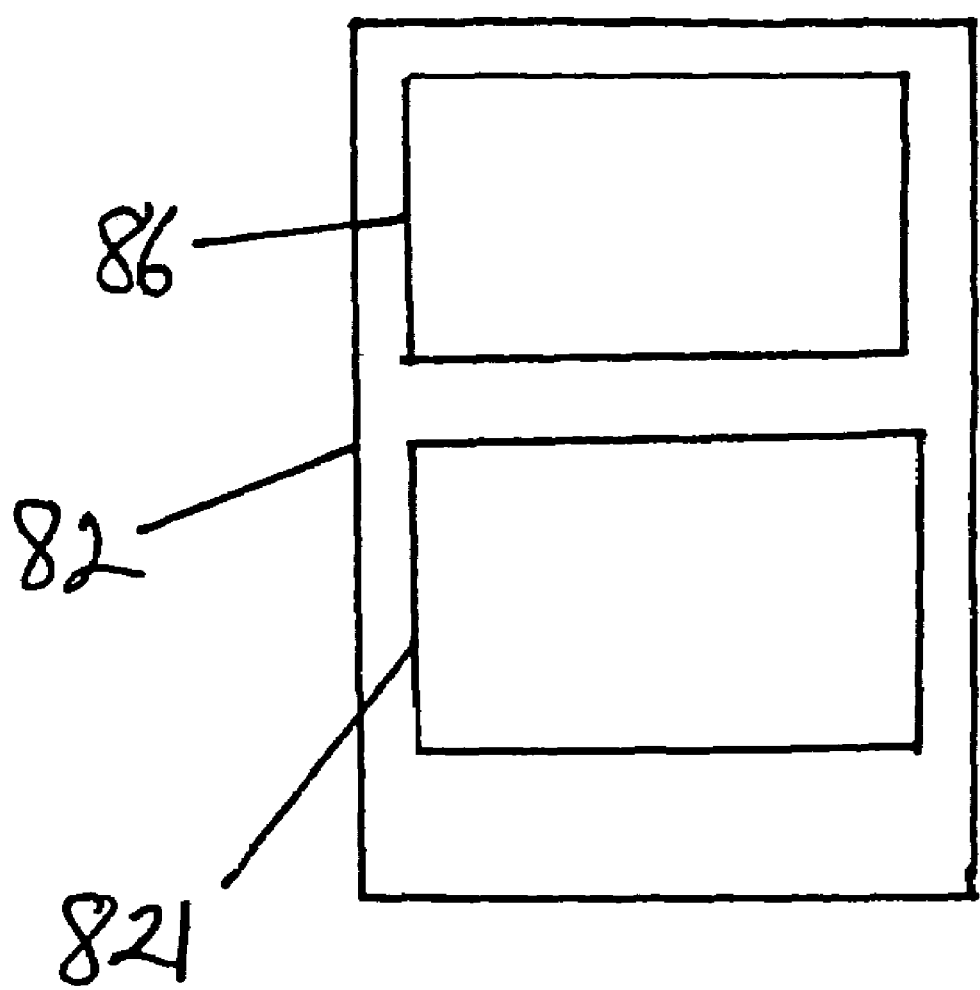

DIALOG PROCESSING METHOD AND APPARATUS FOR UNINHABITED AIR VEHICLES

FIELD OF THE INVENTION

This invention relates to a method and system for voice and text processing and voice and text generation. More specifically, this invention provides for voice and text processing on board uninhabited air vehicles enabling dialogic communication between the air vehicle and other parties.

BACKGROUND OF THE INVENTION

Uninhabited air vehicles (UAVs) are specifically designed to operate without an onboard operator. UAVs are of multiple vehicle types, various sizes, and intended for diverse roles. The adoption of UAVs for a variety of current and future missions depends upon increasing their safety and performance.

UAVs now operate in complex scenarios using sophisticated technology. These complexities are expected to increase as their roles become more diverse. UAV safety requirements include FAA standards, collision avoidance and situational awareness. Communications is of critical importance for each of these requirements and for increasing UAV performance. UAVs must communicate among and between other vehicles, remote, human-operated control sites, and at ground sites. Safe interaction with these parties is a critical requirement for wide deployment of UAVs.

Air Traffic Control (ATC) is currently an analog, wireless, voice communication and sometime text based process that UAVs must successfully encounter. This requires that any autonomous air vehicle must appear to ATC as a human pilot controlled vehicle. The UAV must listen to and respond with natural human language. Since UAVs have been unsuccessful at these tasks, they have only been deployed in areas far from commercial air traffic for safety reasons.

Voice processing systems will allow UAVs to fulfill missions in a safe and efficient manner. They have become popular for simple, non-critical interactions. Most commonly, these systems have been used on telephone networks to acquire and dispense information for callers. In such a system, a caller is able to designate a party to be called, which activates the automatic retrieval of a pre-registered telephone number.

Voice processing systems have recently been implemented in more diverse and sophisticated areas including automobile navigation systems. These particular systems are able to interpret human vocal input directed towards the efficient navigation of a motor vehicle. A navigation limited vocabulary is utilized to respond to navigation limited input. The navigation of the car is dynamically linked to some global positioning system to coordinate the location of the vehicle with a stored map.

A voice processing system quantizes and samples sound waves to generate digital data representing amplitude and frequency of the waves. The sound waves are input through a microphone. The amplitude of the analog voltage signal is measured by an analog-to-digital converter and converted to representative binary strings. These binary strings are stored in a memory. A control system is used to relate incoming voice data with stored voice data. A digital-to-analog converter is used to transform the binary strings back to wave energy that may be output through a speaker.

These systems are typically composed of two units, voice recognition and voice synthesis. The primary difficulty with current voice recognition units is the need for large capacity databases and sophisticated algorithms for discriminating and parsing the incoming vocal data. These systems rely on analog signals that are input through a microphone. These signals are transformed to digital signals by an analog-to-digital converter. The system then analyzes the digital signal, recognizes the data and automatically retrieves information that has been stored in the system memory in response.

Large databases of sounds, words and word combinations are required to anticipate the many possible inputs. This is especially true when voice recognition is employed with human interaction. Sophisticated algorithms are required to discern the intended input from noise, interference or unintended utterances.

Speech synthesis, or voice generation, also requires large databases and sophisticated algorithms. Voice data is stored in a database and retrieved when appropriate. A digital to analog converter is utilized to transform the digital data from the memory to an analog signal resembling human voice made audible through a speaker. Wavetable synthesizers generate sound through processing sound waveforms stored in a wavetable memory. Again, to anticipate accurate communication with human interaction requires storing large and many multiple waveforms.

To increase the accuracy of voice processing systems, larger databases, faster processing, and honed extraction algorithms may be used. Each of these solutions is limited. Thus, one must find a balance between these elements to achieve satisfactory results for particular situations.

Voice processing systems will be more widely used if they perform better. More complex tasks may be automated with improved voice processing. UAVs may be more widely deployed and utilized for more complex missions with accurate and efficient voice processing.

Text processing is also needed for successful UAV deployment. Commands may come in the form of digital text that must be parsed, defined and its meaning deciphered. The UAV should also be able to output appropriate responses or initiate a dialog via text output.

Much of text processing is similar to voice processing. Incoming words and phrases are compared to stored words and phrases on a database. Generally, less signal processing is required but interpretation is still a difficult task.

Useful voice and text processing for a UAV is also benefited by natural language processing (NLP) systems. Natural language processing are automated methods of discerning the meaning of arbitrary language expressions such as phrases and sentences. Natural language processing depends on algorithms that determine the definition of words within the context of the phrase or sentence the word or phrase finds itself. By determining definitions within context, phrase meanings and sentence meanings are determined.

Several methods of implementing dialog management exist for NLP. One method allows the specification of context by specifying the likely dialogs predicted to take place specified in a grammar that has certain variables left undefined. These variables are known as slots. The variables in the slots are filled in when surrounding context is matched during executing of the dialog. In the present state of the art, dialogs defined by a grammar are specified long before they are intended to be used and do not change throughout the lifetime of the product. Although tools exist to help automate and test grammar construction, it often requires human intervention in order to be fine-tuned for use by humans.

Another NLP method utilizes dialog state information to determine dialog meaning. States are predetermined and the actions or responses are predefined for each transaction. A state table is developed containing the present state of the dialog, and the responses appropriate for each state. This table is referred to by the dialog manager to generate proper responses.

Natural language processing abilities will enable a UAV to function more seamlessly within its active environment. This includes more accurate communication between the UAV and ATC.

SUMMARY OF THE INVENTION

The invention consists of a speech and text dialog processing system for UAVs that utilizes state information from the UAV's control system. State information generated by the general control systems of the UAV are integrated into the dialog processing system for recognition and interpretation purposes. The dialog processing system resides on the UAV and is an integrated part of the autonomous UAV system. The dialog processing system is dynamically linked to the UAV control system to support recognition and interpretation units. This linked system dynamically accesses detailed state information including past and predicted state information generated by the UAV control system on a continuous basis.

The system consists of a UAV control system that generates UAV state information. The state information may include past UAV states as well as predicted UAV states. Some of this information may be derived from the mission planning part of the control system. A recognition unit receives voice and text input from a party. The recognition unit processes the incoming data to an acceptable signal for an interpretation unit.

The interpretation unit also accepts the UAV state information on an on-going basis. This state information is utilized by the interpretation unit to help give the voice and/or text input context and enable more accurate interpretation of the data.

This data is processed to derive an appropriate response. The response is generated by the response unit. The response unit may either utilize voice synthesis or text generation to output its data.

In addition, ATC dialog is ordinarily constrained. Therefore, the invention takes advantage of the particular peculiarities of this dialog to enhance its recognition and synthesis capabilities. The invention may also utilize natural language processing methods.

BRIEF DESCRIPTION OF DRAWINGS

FIG. 5 is a detail of the blocks of the audio circuit.

DETAILED DESCRIPTION OF THE INVENTION

Figure 1:
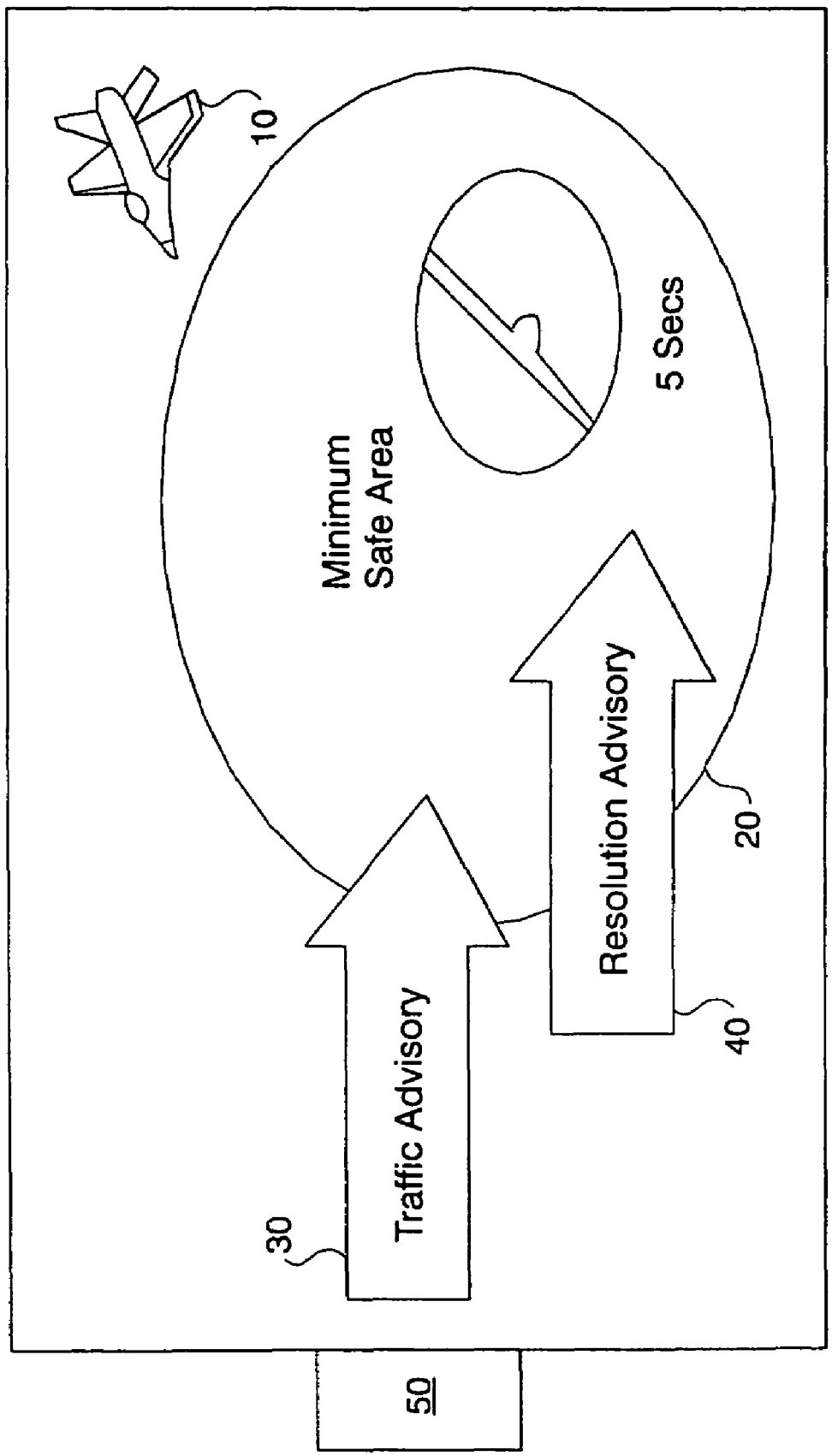
FIG. 1 represents a high level graphical description of the invention.

This invention dynamically integrates voice and text processing with UAV state information, (past, current, and predicted state), to provide the UAV with quick and accurate communication with other parties. The control systems of the UAV supply continuous state information to an interpretation unit. The state information can include variables such as altitude, yaw, pitch, roll, velocity, and others. The state information can also include information from a mission management system. The state information may also be past states, present states or predicted states for any of the variables. An interpretation unit utilizes this state information, together with input from a recognition unit, to devise an appropriate output for a response unit.

The preferred embodiment of the invention utilizes natural language processing (NLP). A dialog manager is implemented that utilizes the state information of the UAV to process and interpret input from the recognition unit. Logically, the recognition unit receives conversational speech or text from an external source such as, but not limited to, the ATC. This input is converted into a digital signal for the interpretation unit. The interpretation unit uses a dialog manager to construct an appropriate response by placing the dialog into a context comprising UAV state information, history of the dialog, the known vocabulary of ATC dialog as well as other factors. The dialog manager computes an appropriate output, which is then either synthesized by a voice synthesis unit or output in text by the response unit.

In the present invention the development of a dialog is integrated into the UAV dialog processing system rather than done in isolation from the UAV. This can be achieved through a variety of mechanisms that vary in the level of integration. For example, when interpreting the dialog, understanding the syntax of the dialog and following its grammar can be enhanced with access to UAV state information. Thus, a context can be defined not only in terms of the surrounding text, but also in terms of the UAV state. As a simple, specific, example, an air traffic controller asking the UAV, "what is your location?" would have a different context depending upon whether the UAV were on the ground or in the air. More importantly, this context, including the aircraft's state with regard to 'on the ground' or 'in the air', would be an integral part of the dialog's syntax.

Another, higher level of integration assumes that a large dialog is broken into smaller pieces, termed, sub-dialogs. A Finite State Machine (FSM) drives the sub-dialogs. In current state of the art natural language processing, the states within the FSM are the particular dialogs currently active, the input to the FSM is spoken or written user input, and the next state is determined by the current state and the user input. That is, the set of inputs are the commands or requests from an ATC and/or from the UAV itself. The set of outputs are the responses to these requests. The set of states are the active dialogs held in a RAM. An interpretation unit maps the states and generates a signal to some output such as a synthesized voice response.

Note that the UAV control system can be represented in the form of an FSM as well. At this level of integration the NLP and UAV FSM are combined. A simple algorithm for combining the FSMs is to use the current UAV state as part of the NLP input in determining the next state, that is, the next sub-dialog to become active. Breaking down a dialog into sub-dialogs is helpful in managing and developing a complex dialog. A single, large dialog is more likely to contain errors in the form of false positive context matches. A smaller sub-dialog is more likely to match only the intended spoken input from the ATC. This is particularly important in a noisy environment in which other conversations or interference may be inadvertently picked up by a microphone.

Finally, given the goal of completely autonomous behavior, it is possible the grammar can be used to construct dialogs onboard the UAV while in-flight. This mechanism can take two forms. In one form, a program compresses a potentially large dialog into algorithmic form, that is, into a program that, when executed, reconstructs the dialog, replacing various patterns as necessary to suit the given UAV capabilities and mission. The primary goal of this technique is memory savings and a limited amount of automatic configuration of the dialog. A more ambitious mechanism is one that implements a learning capability. In this case, the dialog and syntax are malleable. Previously unknown spoken patterns can be automatically added to the dialog to help improve contextual recognition of slots or dialog states.

FIG. 1 depicts the context in which the invention functions. The UAV 10 is flying within space controlled by an ATC. There exists a minimum safe area 20 in front of the UAV as it approaches some other entity. The UAV 10 receives traffic advisories 30 and resolution advisories 40 within the minimum safe area from the ATC 50.

Figure 2:
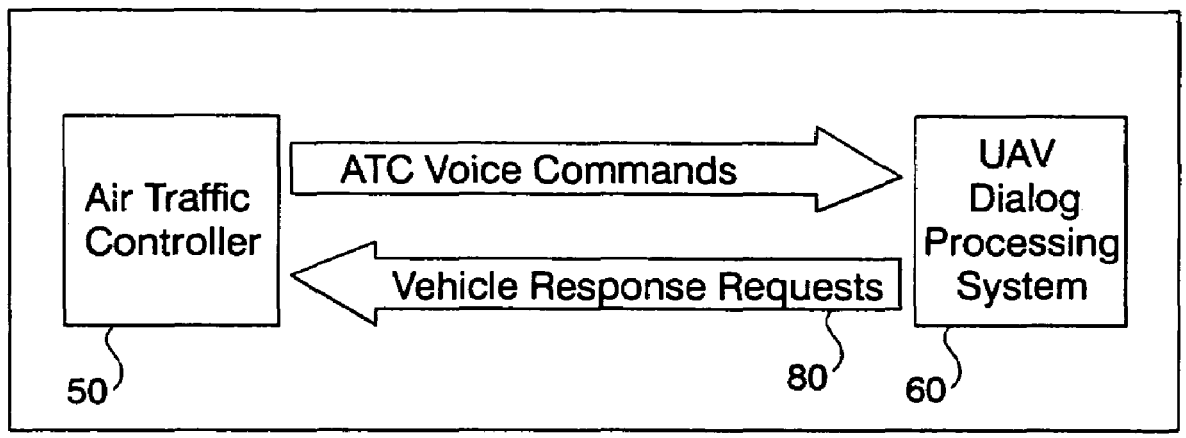
FIG. 2 is a logical depiction of the dialog between the ATC and the UAV.

As shown in FIG. 2, these advisories and commands 70 are communication between the ATC 50 and the UAV dialog processing system 60. They include voice and/or text commands from the ATC 50 to the dialog processing system of the UAV 10 and responses and requests 80 from the UAV 10 to the ATC 50.

It should be noted that the invention may be a machine initiated, $3^{rd}$ party initiated or mixed initiated system. It is not necessary that the invention first receive data from some other party. The invention is capable of initiating a dialog when the circumstances warrant. Therefore, the term response unit does not necessarily imply a response to a request from a $3^{rd}$ party but can be a response to some state information from the UAV itself.

Figure 3:
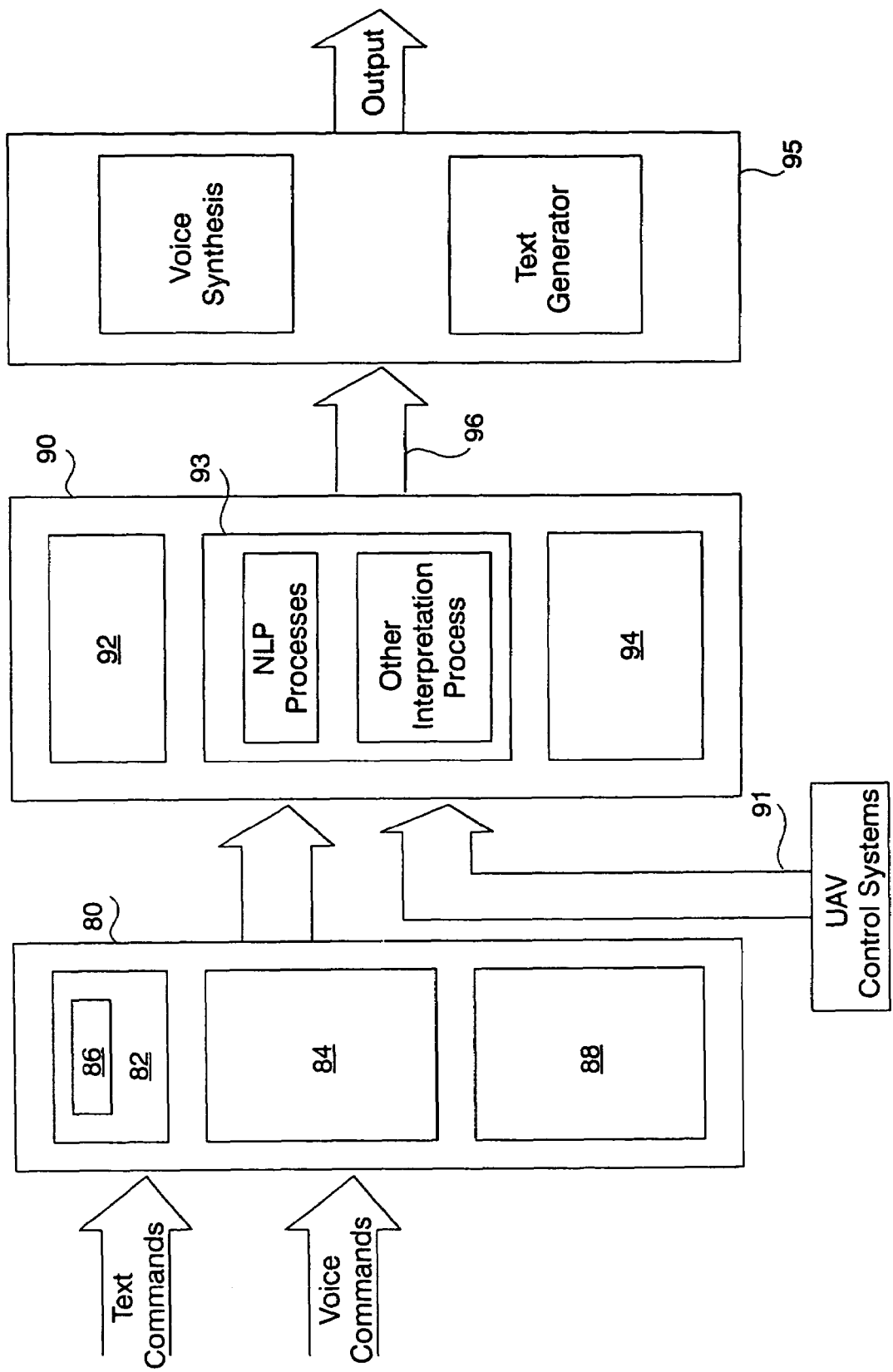
FIG. 3 depicts a logical overview of the operational units of the invention.

The invention enables this interaction to happen automatically and seamlessly. FIG. 3 shows that command detection is accomplished by the recognition unit 80. In this embodiment the recognition unit is receiving commands from the ATC. The recognition unit 80 contains an audio circuit 82 that transforms analog signals from a microphone 84 to digital signals for a processor. An analog to digital converter 86 is used to transform the signals. The audio circuit 82 may also provide for additional signal processing 821 as shown in FIG. 5. The recognition unit 80 also contains a text circuit 88 for providing formatting of incoming text for the processor. The recognition unit 80 utilizes parsing to extract the commands from input containing noise or incorrect commands. Voice data may be split into sub-dialogs at this stage.

The processed digital signal 89 is then interpreted against a database 92 of context specific words, phrases and commands in the interpretation unit 90. The signal 89 is also analyzed within the context of the UAV state information 91. This can include past and predicted states as well as the present UAV state. Natural language processes may also be employed including using slots and dialog state information. Here is where all the input information may be algorithmically reduced to a FSM.

Figure 4:
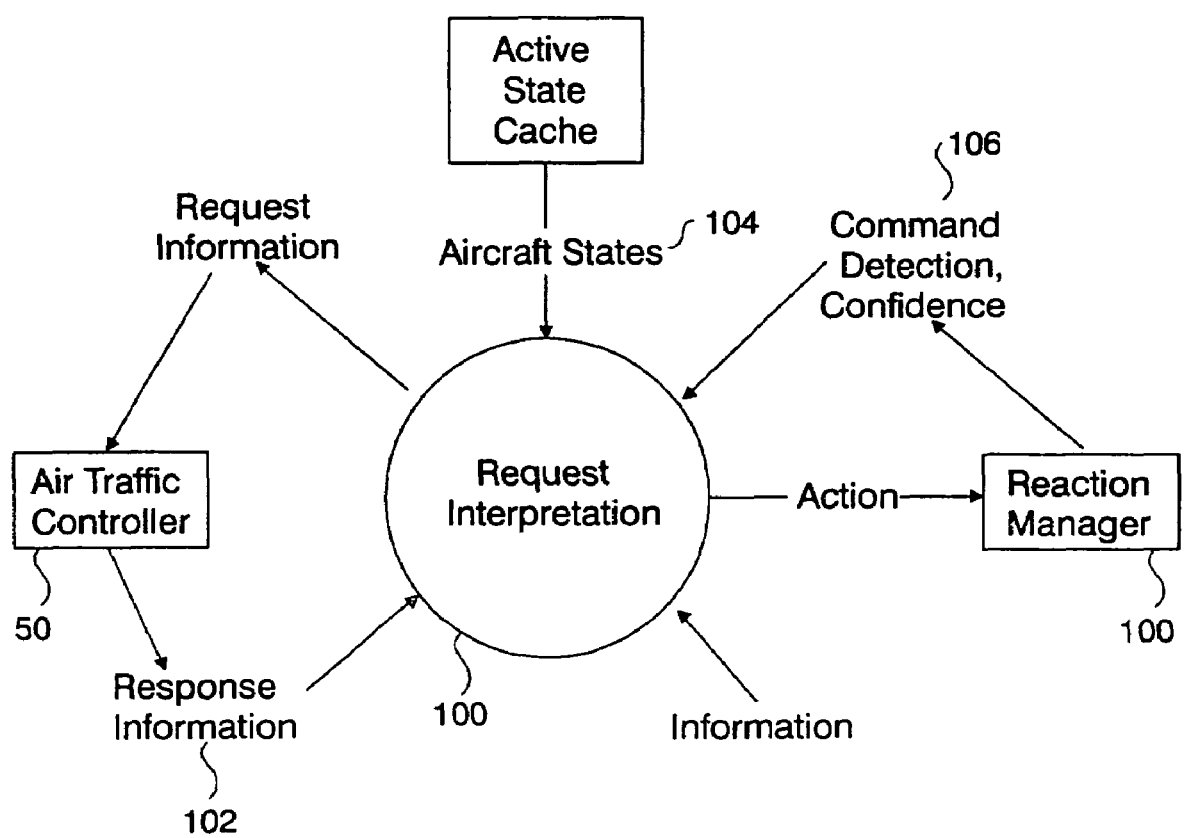
FIG. 4 depicts some of the context of an embodiment of the invention.

This context is further diagrammed in FIG. 4. An ATC 50 requests information from the UAV. Request interpretation block 100 uses formal ATC command language to produce response 102. The responses are formulated using UAV states 104 and a detection confidence algorithm 106. The detection confidence algorithm is used to weight and order possible responses.

Continuing with FIG. 3, dialog manager 93 controls which sub-dialog is currently active by and placed in the RAM 94 during a dialog transitioning from one "dialog state" to another. The RAM 94 only holds the sub-dialog required for the current and possibly future state. This dialog state may be merged with the UAV's past, current, and predicted state to improve the accuracy of the voice recognition abilities. The grammar used to guide the speech recognition abilities can be constructed dynamically while the UAV is in flight. The current and predictive states of the UAV in flight are changing over time as indicated by the control system. This dynamic is used to increase the accuracy of the recognition unit 80 by incorporating UAV state information 91 into the speech recognition algorithm. The dynamic also decreases the RAM requirements since the RAM 94 will hold the sub-dialogs necessary for the present state and possibly future state. The RAM 94 need not hold all sub-dialogs of a present dialog.

The interpretation unit 90 outputs a response signal 96 to the response unit 95. The response unit responds by either text or synthesized voice. The response signal 96 is transformed to the appropriate output for the circumstances.

FIG. 5 shows a logical detailed view of the audio circuit 82. The audio circuit contains an analog to digital converter 86 and signal processing means 821 for filtering, parsing and other processing. The text circuit 88 also contains signal processing means.

To increase the performance and efficiency of the speech processing system, the dialog database is also limited to typical ATC dialog and phrases.

Accordingly, it should be readily appreciated that the dialog processing system of the present invention has many practical applications. Additionally, although the preferred embodiments have been illustrated and described, it will be obvious to those skilled in the art that various modifications can be made without departing from the spirit and scope of this invention. Such modifications are to be considered as included in the following claims unless the claims expressly recite differently. It should be particularly noted that many of the features of the invention presented as logical blocks can take a number of forms and may be manifested in hardware and software as well as being inbedded.

What is claimed is:

1. A dialog processing system for an uninhabited air vehicle comprising:
    a control system that records a state of the UAV;
    a recognition unit for recognizing text and analog speech input data;
    an interpretation unit dynamically linked to the control system and linked to the recognition unit for interpreting the input data;
    a response unit linked to the interpretation unit for producing text or audible analog speech output data;
    whereby the interpretation unit utilizes UAV state data to interpret the input data to generate appropriate output data.

2. A dialog processing system as in claim 1 wherein:
    the interpretation unit utilizes natural language processing.

3. A dialog processing system as in claim 1 wherein:
    the voice interpretation unit comprises a dialog manager that controls which sub-dialog is active by transitioning from one dialog state to another.

4. A dialog processing system as in claim 1 wherein:
    the input data is dynamically merged with UAV states selected from the group consisting of current states, past states and predicted states.

5. A dialog processing system as in claim 1 wherein:
the input data is dynamically merged with past, present and predicted states of the UAV.

6. A dialog processing system as in claim 1 wherein:
the interpretation unit is limited to a predetermined air traffic control specific vocabulary.

7. A method of dialog processing for an uninhabited air vehicle comprising:
detecting commands;
interpreting the commands in context of dynamic UAV state information; and
producing responses in accordance with the interpretation of the detected commands.

8. A method of dialog processing as in claim 7 wherein:
natural language processing methods are used to interpret the commands.

9. A method of dialog processing as in claim 7 wherein:
UAV state information includes past, present and predicted states.

10. A method of dialog processing as in claim 7 wherein:
the interpreting step is executed as a finite state machine.

11. A method of dialog processing as in claim 7 wherein:
the commands may initiate from the UAV.

12. A method of dialog processing as in claim 7 wherein:
the commands may initiate from a source external to the UAV.

13. A method of dialog processing as in claim 7 wherein:
the interpreting step uses a grammar to construct dialogs while the UAV is in flight.

14. A method of dialog processing as in claim 13 wherein:
the interpreting step uses a learning process to add unknown commands to a list of possible commands.

15. A method of dialog processing as in claim 7 wherein:
the commands are broken down into sub-commands.

16. A method of dialog processing as in claim 7 wherein:
the interpreting step is limited to dialog states common to air traffic control dialogs.

\* \* \* \* \*